United States Patent [19]

Nelson

[11] Patent Number: 5,504,514
[45] Date of Patent: *Apr. 2, 1996

[54] SYSTEM AND METHOD FOR SOLID STATE ILLUMINATION FOR SPATIAL LIGHT MODULATORS

[75] Inventor: William E. Nelson, Dallas, Tex.

[73] Assignee: Texas Instruments Incorporated, Dallas, Tex.

[*] Notice: The term of this patent shall not extend beyond the expiration date of Pat. No. 5,151,718.

[21] Appl. No.: 359,358

[22] Filed: Dec. 19, 1994

Related U.S. Application Data

[63] Continuation of Ser. No. 170,435, Dec. 20, 1993, abandoned, which is a continuation of Ser. No. 835,180, Feb. 13, 1992, abandoned.

[51] Int. Cl.$^6$ .................................................. G02B 26/08
[52] U.S. Cl. ......................... 347/130; 347/134; 362/800
[58] Field of Search .................................... 347/130, 134, 347/135; 355/228, 229; 250/494.1; 362/235, 244, 249, 800

[56] References Cited

U.S. PATENT DOCUMENTS

| | | | |
|---|---|---|---|
| 4,428,647 | 1/1984 | Sprague et al. | 250/494.1 X |
| 4,700,206 | 10/1987 | Yamakawa | 346/160 |
| 4,734,734 | 3/1988 | Yano | 355/218 |
| 4,856,863 | 8/1989 | Sampsell et al. | 350/96.16 |
| 4,907,034 | 3/1990 | Doi et al. | 355/327 |
| 4,927,230 | 5/1990 | Tokumitsu | 350/96.24 |
| 4,935,665 | 6/1990 | Murata | 362/800 X |
| 5,032,960 | 7/1991 | Katoh | 362/244 X |
| 5,041,851 | 8/1991 | Nelson | 346/160 |
| 5,043,716 | 8/1991 | Latz et al. | 340/782 |
| 5,055,855 | 10/1991 | Nishio | 346/107 R X |
| 5,138,340 | 8/1992 | Sprague et al. | 346/108 |
| 5,144,117 | 9/1992 | Hasegawa et al. | 362/800 X |
| 5,151,718 | 9/1992 | Nelson | 355/229 X |

FOREIGN PATENT DOCUMENTS

| | | |
|---|---|---|
| 0332953 | 9/1989 | European Pat. Off. |
| 0433985 | 6/1991 | European Pat. Off. |
| 62-127707 | 10/1987 | Japan . |
| 63-189265 | 8/1988 | Japan . |
| 2-386 | 1/1990 | Japan . |
| 2123247 | 1/1984 | United Kingdom . |

Primary Examiner—Nestor R. Ramirez
Attorney, Agent, or Firm—Julie L. Reed; James C. Kesterson; Richard L. Donaldson

[57] ABSTRACT

There is disclosed an optic system for illuminating a spatial light modulator array in a xerographic printing process consisting of an array of LED emitters constructed to efficiently replace the conventional tungsten source used in prior art. The array of LED emitters can be geometrically configured or electrically operated by strobing or varying the brightness of individual pixels to compensate for other system optical deficiencies and results in improved printing process. By exposure strobing the LED source correction for fuzzy line edges can be achieved.

4 Claims, 4 Drawing Sheets

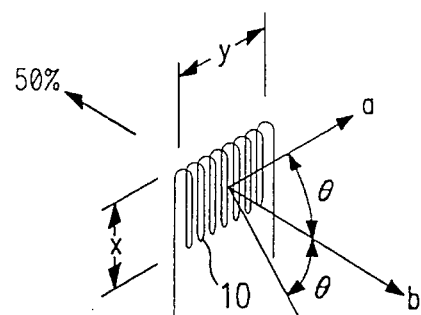
FIG. 1a
(PRIOR ART)
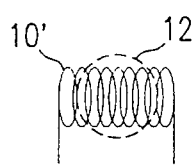
FIG. 1b
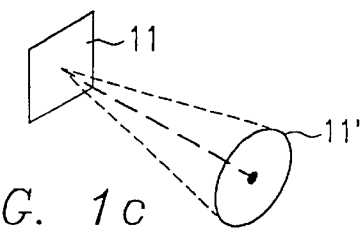
FIG. 1c
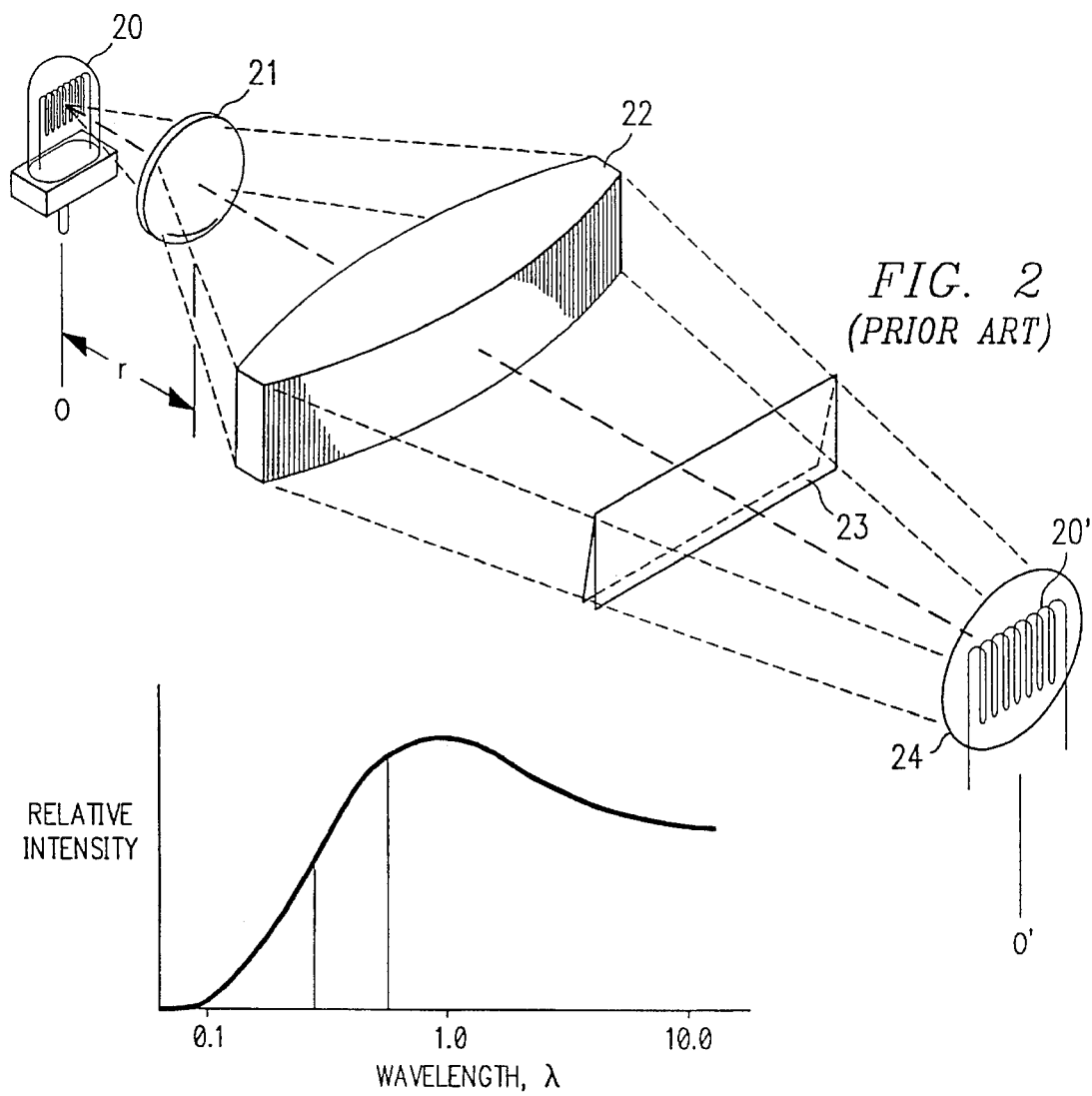
FIG. 2
(PRIOR ART)
FIG. 3
(PRIOR ART)

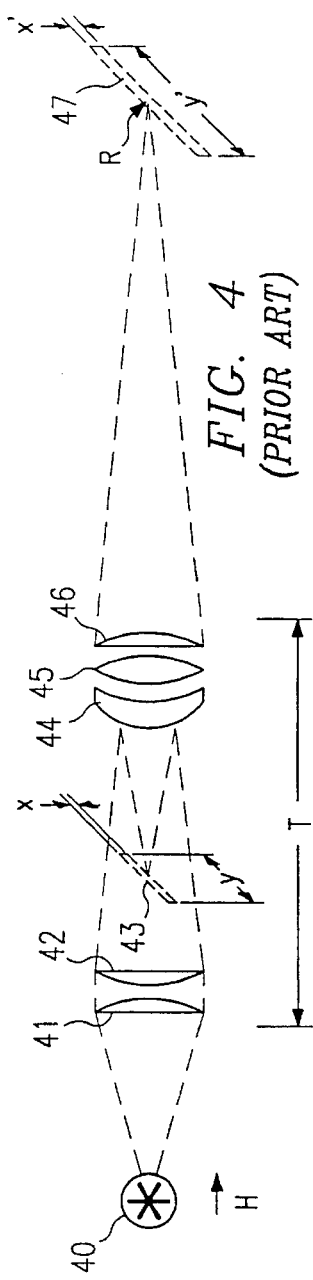
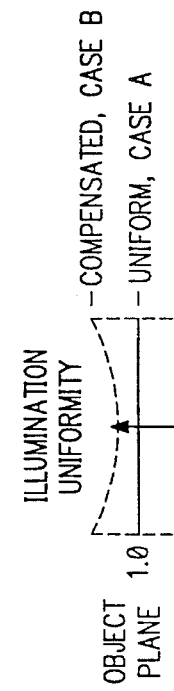
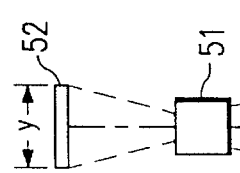
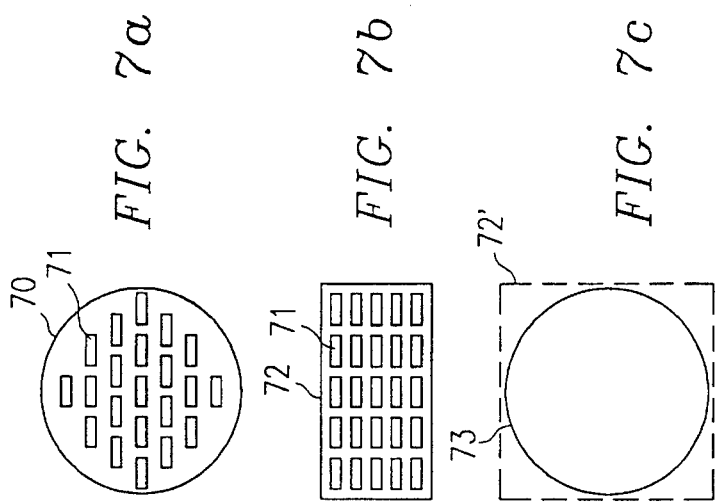
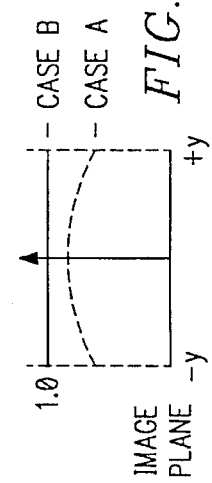
FIG. 4 (PRIOR ART)
FIG. 5a (PRIOR ART)
FIG. 5b
FIG. 5c
FIG. 7a
FIG. 7b
FIG. 7c

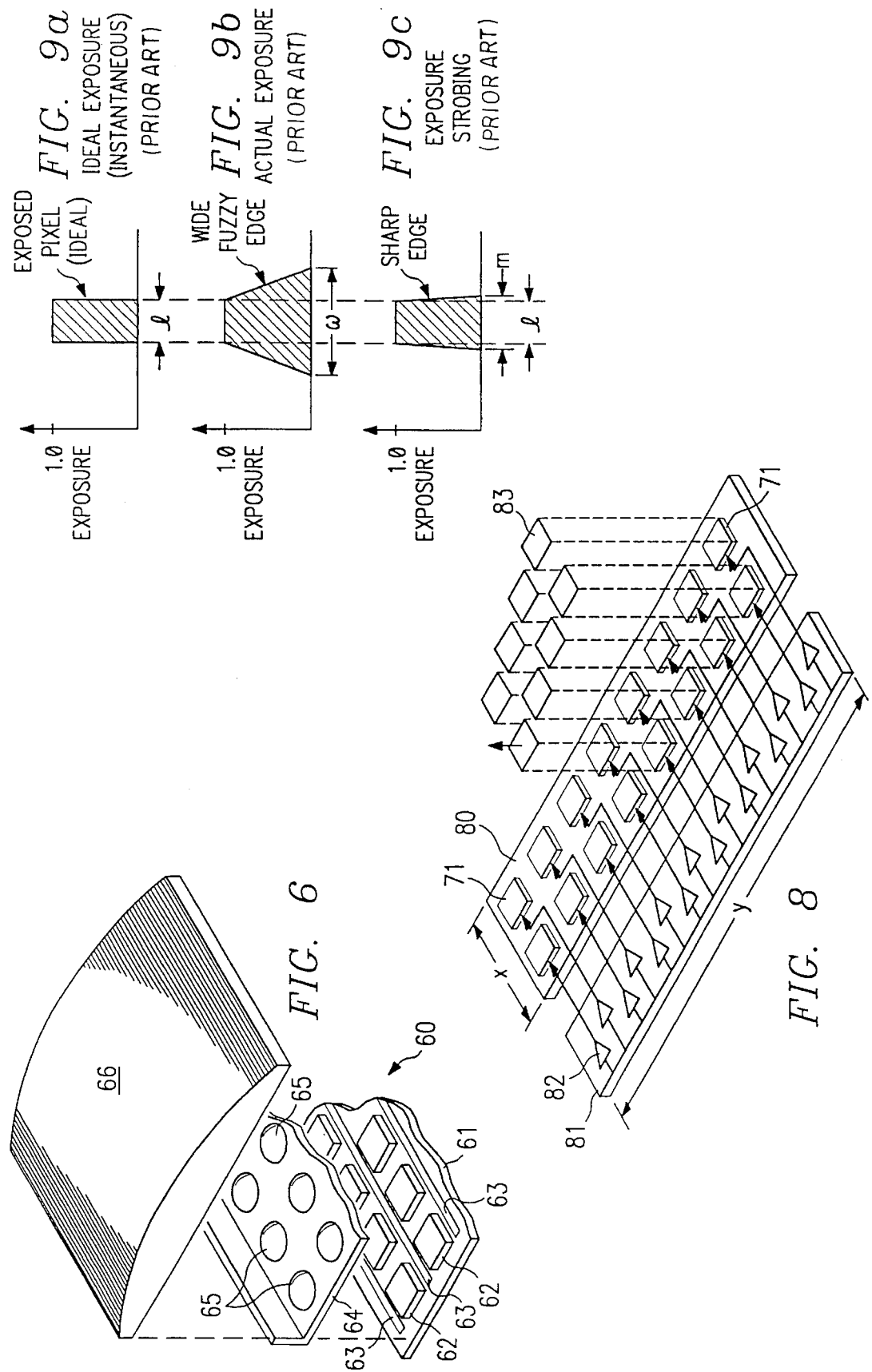

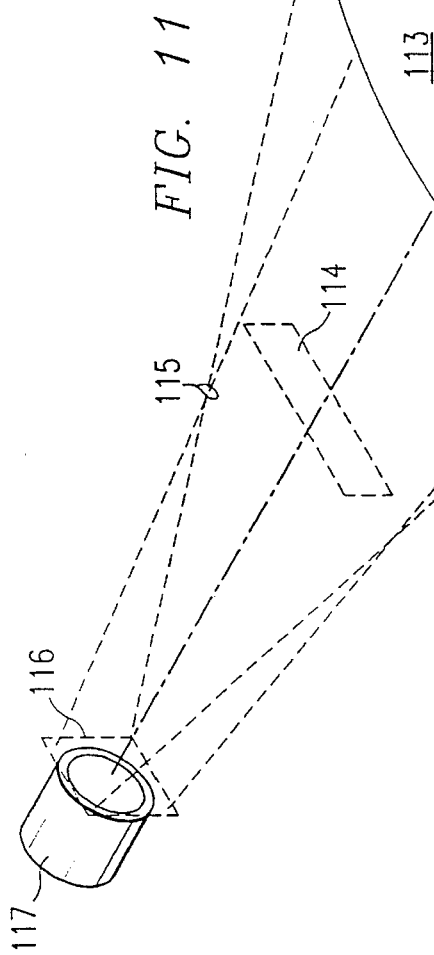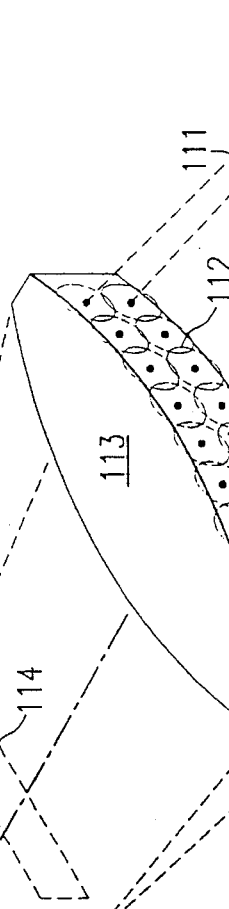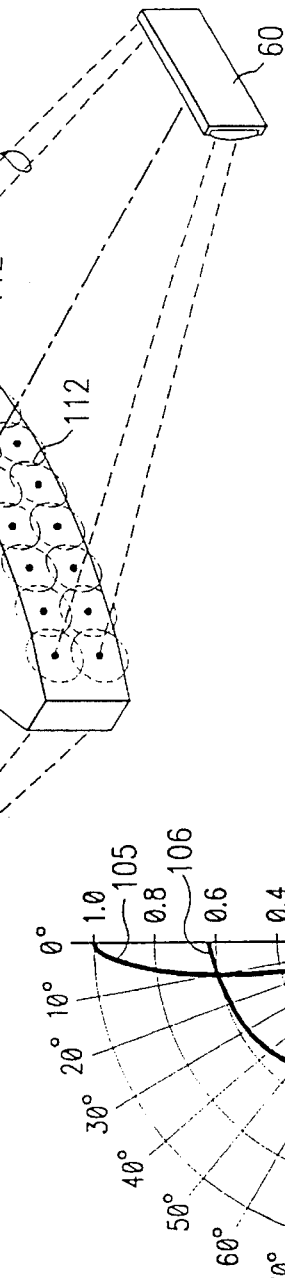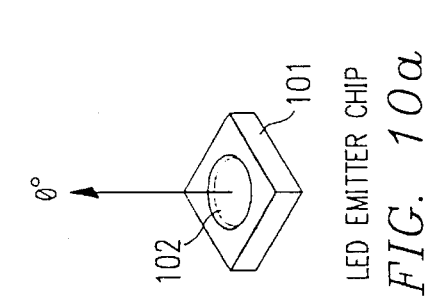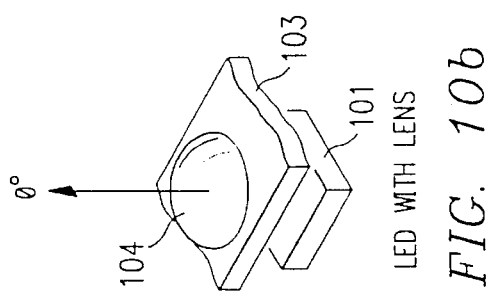

SYSTEM AND METHOD FOR SOLID STATE ILLUMINATION FOR SPATIAL LIGHT MODULATORS

This application is a Continuation of application Ser. No. 08/170,435 filed Dec. 20, 1993, which is now abandoned, which is a continuation of application Ser. No. 07/835,180 filed Feb. 13, 1992, which is now abandoned.

TECHNICAL FIELD OF THE INVENTION

This invention relates to a spatial light modulators and more particularly to illumination systems and methods of operation for such devices.

BACKGROUND OF THE INVENTION

Semiconductor light modulators, such as deformable mirror devices (DMD), liquid crystal arrays, and electro-optic crystals, are gaining in popularity as a replacement for the laser polygon scanner in xerographic printing processes. A technology of preference, due to its monolithic, semiconductor fabrication process, is the deformable mirror device (DMD). Issued U.S. Pat. No. 5,061,049 entitled "Spatial Light Modulator Printer and Method of Operation", assigned to the common assignee with this patent application, which patent is hereby incorporated by reference herein, discusses one embodiment of a spatial light modulator using a tungsten light focused via optics on a spatial light modulator array. While the invention in that application functions very well, several areas of improvement have become apparent.

These improvements center around the reduction in power consumed, reduction in overall physical size of the system and improved uniformity of illumination across the spatial light modulator array. Tungsten sources, like all incandescent filaments, emit light, more or less isotropically, which must be collected and focused by condensing optics if the light energy is to be efficiently utilized by the modulator elements. In addition, a major byproduct of incandescent light is the production of heat which in turn demands an ability of dissipating the heat. This, in turn, requires bulky structures, or plenums, to move the heat away from the source, as well as fans with their inherent noise/reliability issues.

Because incandescent light is lambertian in its emission character, the rays must be collected from all sides of the filament and focused, thereby requiting fast optics which again argues for large size and cost, to avoid wasted power due to collection inefficiencies.

Accordingly, one problem in prior art spatial light modulator structures is the excessive power required to support the light source coupled with large size, both for the optics and for heat disposition. The aforementioned patent application shows the spatial light modulator array positioned in the light energy stream between the light source and the imaging lens aperture. In order to achieve maximum energy transfer, it is necessary to fill the imager aperture with the modulated light image from the spatial light modulator array. The imager lens is designed, for cost and other reasons, to be round and thus a nearly square filament image aspect ratio magnified to overfill the imager, must be presented to the lens to insure that the lens is filled. This arrangement, while performing properly, suffers from the problem that not all of the power modulated by the spatial light modulator can be passed by the imaging lens, and not all of the light collected by the condenser lenses can be concentrated on the spatial light modulator active area.

The latter problem exists for printing systems in that a spatial light modulator array is necessarily elongated or linear in aspect, and thus the light pattern reaching the array must be wider than it is high by a significant proportion, compared to either the filament aspect ratio or the aperture of the imager. Because the image of the source must simultaneously come to focus on the imaging lens circular aperture and at the same time uniformly illuminate the full length of the spatial light modulator which is maintained between the aperture of the collimator lens and the imaging lens, and since the spatial light modulator is substantially wider than it is high, in order to fully illuminate the array the resulting aspect of the light necessitates considerable width of illumination above and below the active area of the spatial light modulator device that is subsequently "wasted".

Another problem is that the focused image from the spatial light modulator is continuously projected onto a moving drum. Thus, during the exposure period of a dot-line, for any pixel image location the drum will rotate a given distance and broaden or blur that pixel image. A plot of the light energy on the drum for that pixel location will reveal that the maximum light energy transferred to that pixel will reach a peak level only at the centroid of the pixel and will build up to that point and fall off from that point in the shape of a pyramid. This pyramidal spreading of the pixel energy is not optimum for minimum feature formation and thus reduces the sharpness of the xerographic image in the process direction.

A further problem with existing spatial light modulator structures and systems is the fall-off of the light energy on the outer periphery of the spatial light modulator array, particularly with elongated arrays, due to the difficulty in collecting and directing light energy from lambertian filament sources.

A still further problem with such existing systems is that optic intensity is not constant or uniform over the whole filament array and there is not a practical method for adjusting the optic characteristics of the light source after manufacture.

Another problem is that the generally available tungsten light sources have filament aspect ratios that are not optimum for spatial light modulator light modulator systems. Another problem is the relatively limited lifetime of the tungsten sources.

A final deficiency of the tungsten source is that of the thermal inertia, or lag time of the filament, making it impossible to vary the light output of the source within a printing line time, as is desirable to compensate for specific printing deficiencies.

SUMMARY OF THE INVENTION

A solid state optical source, such as a light emitting diode (LED) array, has been substituted for the tungsten light source in conventional spatial light modulator systems. The LED array can, in one embodiment, be fashioned as a single unit with individual lenses and LED chips arranged to make up various array structure configurations. Alternatively the structure can be a substrate of flexible material on which has been fashioned an array of LED chips and lenses. Each lens is associated with an LED emitter or a group of LED emitters so that the light from said emitters is efficiently directed and focused onto a particular region of an opposing spatial light modulator array or an intervening optical element that further shapes the ray to bundle prior to the spatial light modulator. Examples of such modulators include deformable mirror devices (DMD), liquid crystal arrays, and electro-optic crystals.

Additionally, the emitter array could simply be an appropriate area array comprising numerous individual LED emitters or laser diode elements. This area array could be sawn directly from a production wafer and interconnected to operate in parallel.

Using this structure and method results in lower total power at the light source and its associated power supply, requires smaller optics due to the efficient light collection of the integrated lens arrays, and eliminates the need for cooling fans. An added benefit is an ability to adjust the light pattern by the geometry of the array or by flexing the substrate structure so as to improve upon any inherent nonuniformity of the conventional tungsten source and condenser optics. This enhancement can be accomplished during the manufacturing process and can also be fine tuned during operation of the systems.

The individual elements of the solid state light source can also be electronically adjusted, both at manufacture and during operation so as to improve the light transfer characteristics of the spatial light modulator array.

Accordingly, it is one technical advantage of this invention that a solid state light source, such as an LED array, or a surface emitting laser diode array, can be used as a replacement for the incandescent light source in a spatial light modulator array.

It is a further technical advantage of this invention that a spatial light modulator array is integrated with a compact, flexible solid state light source that can be adapted or configured to allow for optical adjustment to compensate for uneven illumination of the spatial light modulator array, as well as to improve illumination characteristics and modulation efficiency of the spatial light modulator system.

It is a further technical advantage of this invention that the LED illuminator and spatial light modulator light modulator system can together be operated in a manner to improve the print quality of a xerographic printing process.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIGS. 1a, 1b and 1c show characteristics of the prior art filament source light;

FIG. 2 shows the prior art source light projected through lenses to form an image;

FIG. 3 shows a graph of the intensity of prior art light from a tungsten source indicating the relative wave length region of interest for the printing process;

FIG. 4 is a schematic of the elements of the prior process;

FIGS. 5a, 5b and 5c show the problem of illumination uniformity with the prior art and the correction or compensation with the present art;

FIG. 6 shows a schematic assembly of the LED array and the initial optics that would go with that module;

FIGS. 7a, 7b, and 7c show configurations of LED's on substrates that could be used;

FIG. 8 shows an LED array substrate with individually addressable elements;

FIG. 9a shows an ideal exposure of a pixel;

FIG. 9b shows the actual exposure in the prior art printing process;

FIG. 9c shows the exposure strobing that can be accomplished with the proposed invention;

FIGS. 10a, 10b and 10c show the light emission patterns of LED devices with and without primary collection optics; and FIG. 11 shows a schematic of the present system uniformly illuminating the entrance aperture of a secondary condenser lens element and then forming a region of uniform illumination and a source image beyond the lens.

DETAILED DESCRIPTION OF THE INVENTION

Turning now to FIG. 1a, there is shown light element 10 with 50 percent of its light going away from the desired direction, and the remainder of the light going off to the right forming angles theta with respect to a line b normal to the plane of element 10. The significance of arrows a, b and c are that this source is a lambertian source for which the light intensity looks the same to an observer along any direction, so if one does not collect light rays along arrows a and c, which lie well away from central arrow b, considerable portions of the available light energy will be lost. That is in addition to the loss out of the back side of the filament. The filament 10 is indicated as having dimensions x by y which typically are not the desired format for the light source for a spatial light modulator system. Examples of such modulators include deformable mirror devices (DMD), liquid crystal arrays, and electro-optic crystals.

FIG. 1b shows the effect of a light source 10' when magnified to fill an imager aperture 12. By failing to fill it completely in the vertical direction and overfilling it in the horizontal direction it generally results in system inefficiencies as shown by image 10'.

FIG. 1c shows filament 11 radiating into a solid angle and illuminating area 11', representing a first lens surface, which is a relatively small portion of the total forward area that is of consideration in the collection. This illustrates that any collection optics that do not virtually surround the front side of the filament are less than 100 percent efficient in collecting the light. To do so, the lens must be either large, or very dose to the filament, and less than optimum trade-offs are forced on the designer. This is a characteristic problem of the incandescent filaments which are lambertjan radiators.

FIG. 2 shows a prior art system source 20 radiating to collection lens 21 separated from the filament by some distance r. The solid angle that collection lens 21 therefore represents referring back to FIG. 1c is determined by its diameter and by that distance r. It simply cannot fill very much of the forward angle into which the filament in source 20 is radiating. That light that is collected is subsequently redirected onto condenser lens 22 which is a slabbed section of an asphere and does not collect the entire bundle of energy that is redirected by lens 21 resulting in a further reduction in the delivered light converging to area 23, the region of uniformity where the spatial light modulator device schematically resides. This energy is all redirected into filament image 20' at imager lens aperture 24.

FIG. 3 shows a further deficiency of the prior art, namely, that the spectral intensity of the tungsten source at a nominal temperature of 3,000 K is peaked around 1 micron and the great bulk of the energy radiated lies in the 1–10 micron range, that is, as radiated as heat, and very little of it is in the useful visible range indicated by the band between the lines and which can be utilized in a printing system.

FIG. 4 details the radiometry of the prior art as previously discussed in FIG. 2. It shows that any source 40 with radiant output H falling onto collection lens assembly 41 and 42, thereby illuminating spatial light modulator plane 43, and subsequently reimaging onto imager lens set 44, 45 and 46 is subject to a certain efficiency at the image plane 47 solely determined by the brightness of the source H, the transmittance of the entire optical system indicated by T, and shown as spread across the entirety of the optical components, and the solid angle, that is, the speed of the imager lens assembly shown schematically by the dotted lines at the output portion of the imager lens assembly. The final spatial light modulator image at 47, therefore, has irradiance R, which is determined by the light collection efficiency, the system transmittance and the speed of the imager lens. The only way to improve the irradiance at the image of the spatial light modulator is to either make the source brighter, the imager lens faster, or the system transmittance higher. The system transmittance is typically improved by optical coatings. That is a standard practice in the industry. The speed of the imager lens and its corresponding aperture can only be increased to a practical limit due to the spatial light modulator deflection angle, and because higher speed lenses are larger, more costly, begin to affect the spatial light modulator exposure module packaging, and generally reach some practical limit at about a speed of F4.5 due to combined factors. The only remaining variable is to increase the system brightness H at the source, or to concentrate the source output power in the spectral region of interest to the printing process.

FIG. 5a showing radiometry in the prior art details an object plane with a small object simulating spatial light modulator 52, an imager 51 and an image of the spatial light modulator 50 shown magnified.

FIG. 5b shows the presumed illumination of object 52, where in the uniform perfect case, from the −y to +y position on the object, it represents a normalized illumination of 1.0 across the entire surface and correspondingly when that image is related to the image plane 50, FIG. 5c shows again in case A, that the reimaged radiation from the uniform spatial light modulator illumination has actually sagged at the sides of image as shown at −y' and +y' and is less than uniform. In the case of the proposed LED illumination system, it is possible to increase the brightness at the extremes of object 52, as shown by the dotted line compensating case B in FIG. 5b, so that more light is delivered at the edges of the device than at the center. As a result, when the imager has reformed image 50 with the same tendency to roll-off at the ends, we have case B in FIG. 5c, which is schematically represented by a dotted line showing fairly constant uniformity of illumination across the entire image from −y' to +y'.

FIG. 6 shows the proposed LED illuminator assembly 60 consisting of a primary substrate 61 containing metal conductor lines 63 and multiple LED chips shown 62 arranged in a suitable array positioned with respect to a primary aspheric multilens array 64 containing lens elements 65 which reside above and capture the radiation from each of the LED chips 62. This is a separate lens array which is close to but does not actually contact the LED devices. As a result, each element subtends a large solid angle and is therefore able to receive most of the LED light emission. It is possible to form an immersion lens system where the plastic lens is actually molded over the chips and contains them and seals them from contamination and environmental problems and have the lens element 65 still formed above each emitter element 62. Finally, a secondary anamorphic lens 66 may be positioned above this, and serve to condense the light more efficiently in a preferred direction. The compact assembly thus formed is basically the replacement for the incandescent source in the prior art. A graded index lens array (not shown) could also be utilized to collect and direct the LED illumination.

FIG. 7a shows another possible substrate configuration 70, a circle of diameter Ro which can be precisely the diameter of the imager aperture or smaller, and therefore, can be magnified to precisely fill the circular imager aperture. It is populated with LED chips 71 to achieve the desired radiance levels necessary for the printing process. Another alternative in FIG. 7b shows substrate 72 which is rectangular in nature. It is populated again with LED chips 71. This would be magnified anamorphically to fill an imager aperture shown as 73 in FIG. 7c. The most compact and least expensive embodiment of rectangular array 72 would simply be a portion of the LED wafer or surface emitting laser diode array cut from a production wafer. The desired portion could be cut to the desired shape and incorporate a number of individual elements selected to provide the necessary luminous output.

The dotted line 72' represents the anamorphically magnified substrate from FIG. 7b shown as just filling the imager lens assembly. The benefit of this type of illumination is that each emitter on the substrate shown in FIGS. 7a and 7b is equally bright or comparably bright, unlike the case of the filament source shown in the prior art FIG. 1a and 1b, which has a very non-uniform characteristic.

Typically the filament center is hotter and thus brighter, and the edges, particularly where the leads come into the filament, are cool and emit far less energy, so when the imager lens is filled, as shown in FIG. 1b, with this filament image, parts of it are much less efficient in the printing process than is the center so maximum advantage of the full solid angle of the imager lens is not achieved. Referring back to FIG. 4, the solid angle of the imager lens is one of the key variables in delivering energy to the photoreceptor surface. If one does not effectively fill that imager lens aperture one does not, effectively transmit energy to the photoreceptor. The example configurations shown in FIGS. 7a and 7b allow one to simulate a radiating source, or a physical object that behaves like a filament in the prior art, but which is equally bright at all points, and can be built to the exact aspect ratio that best serves overall system performance. In addition, if the individual LED chips are not equally bright, or if one fails, the system operation is not too compromised. Since each spatial light modulator pixel images the entire source to the imager, details of the LED source uniformity are not an extremely critical factor, only the average brightness is of primary significance.

FIG. 8 shows an additional embodiment of an LED array on substrate 80 looking very similar to FIG. 7b with the exception that the individual LED chips 71 can now be driven independently through drivers 82 on driver chip 81. Substrate 80 is possibly separate from driver chip 81, but driver chip 81 could be an integral part of substrate 80. The point here is that under computer control the programmable driver chip can enhance or reduce the light output of the individual elements. The vertical arrow of FIG. 8 indicates the direction of increasing intensity, indicated by the schematic histograms 83, revealing that the center two elements are emitting at a lower light level than the nearest neighbors which are emitting at a lower level than the most outboard elements of substrate 80. For clarity, the LED elements 71 to the left have the histogram omitted. This relates back to FIGS. 5b and 5c where it is proposed to modify the brightness of the illumination from the source to guarantee that the image plane radiation levels are uniform and constant. So by being able to control the brightness profile of the array of LED chips, correction can be made for other deficiencies in the optical system and to achieve a uniformly bright spatial light modulator image. Finally, if substrate 70, 72, or 80 were a flexible film, the actual curvature of the array could be tailored to an optical surface or curve, more compatible with efficient illumination of a condenser element as represented by surface 112 of FIG. 11.

FIG. 9a shows an additional advantage of being able to illuminate the spatial light modulator with an LED array source. Because the LED arrays can be turned on and off in extremely short periods of time, that is, tenths of microseconds, an option that was not available for a typical incandescent source, we are able to simulate the ideal exposure in the printing process. FIG. 9a shows an ideal exposure, indicated as intensity in the vertical direction, appearing as an instantaneous exposure of light energy from a spatial light modulator pixel onto the photoreceptor and representing width l which is the desired pixel line width, or the ideal line width.

FIG. 9b shows what the actual exposure looks like due to the motion of the photoreceptor with a conventional spatial light modulator under continuous illumination. Because the spatial light modulator and the light source remain on for a line time, it actually exposes an area prior to the line of interest and after the line of interest and the net result is an exposed image that is a width w, where w is larger than l, which has characteristic light fuzzy edges as shown in FIG. 9b. This is an undesirable characteristic of the printing process. A simple way to correct that with the LED source of illumination is shown in FIG. 9c, where by exposure strobing, that is, turning the LED on for a short period of time at a higher than normal intensity (which is a common operating mode for LED chips) the energy can be concentrated in the region of interest, that is, the line of width l.

For example, by pulsing the spatial light modulator at three times the normal intensity, but only for 33 percent of the line time, the effective exposed line width, while it is slightly wider than the desired line width of l, as indicated by width m, is very close to the ideal case shown in FIG. 9a. There is still a little bit of fuzziness to the edges, but by shortening the period of exposure the gross blurring of the edges that is a characteristic of the prior art shown in FIG. 9b is eliminated.

FIG. 10a shows an individual LED chip 101 and the active emitting region 102 referenced to an arrow in the forward direction along 0°. FIG. 10b shows a similar chip 101 with lens array 103 and individual lens element 104 in place, again referenced to the arrow along 0°. FIG. 10c shows the relative luminous intensity of the LED emitter versus the forward angle for each of these two chip configurations.

FIG. 10c shows the relative luminous intensity versus the forward angle on the polar diagram. This shows the forward pattern 105 for FIG. 10b with the lens in place indicating that it is concentrated along the axis 0 degrees at a relative intensity of 1.0.

FIG. 10c, line 106 is a curve showing the hypothetical emission pattern from LED emitter chip 101, FIG. 10a without a lens showing that there is much more off axis energy which is not collected and concentrated in the forward direction.

FIG. 11 shows a preferred embodiment of the invention with integrated LED light array 60 having integral lenses. Ray pattern 111 emanates from LED source 60 and falls on the input aperture of condenser lens 113. The detail shown by circles 112 indicates that the rear aperture of lens 113 is uniformly filled by an overlapping array of multiple bundles of light emanating from individual LED emitters in array 60 according to the prescription of FIG. 10b.

Once passing through condenser lens 113, the pattern of light proceeds along ray paths 115 to form a magnified image 116 of array 60 which completely fills and slightly overfills the input aperture of imager lens 117. Between condenser lens 113 and imager 117 lies the region 114 of uniform illumination where the spatial light modulator chip will reside in the exposure module system.

Implicit in FIG. 11 is the fact that while the emitter array 60 is a source of nearly monochromatic light, emitted at the characteristic wavelength of whatever LED material is utilized, and falling entirely in the useful band shown in FIG. 3, the radiation is not coherent as would be the case with a pure laser source of illumination. The multiplicity of emitters are not in phase, hence the disadvantage of coherent sources illuminating very regular periodic structures like the spatial light modulator array, which results in significant energy loss into complex diffraction patterns, is not experienced here, thereby preserving the desired optical performance features of the conventional incoherent tungsten source. The imager lens 117 can be less complex for the monochromatic LED array than for the broadband tungsten source as well.

Although this description describes the invention with reference to the above specified embodiments, it is but one example, and the claims, not this description, limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. An improved method of illuminating area array reflective spatial light modulators using an optical system comprising:

generating source illumination from an array of solid-state light-emitting elements fabricated on a substrate, wherein said elements are configured to direct ray patterns of individual emitting elements into a bundle of light;

positioning a condenser lens having a rear aperture such that said bundles of light from said array of emitting elements uniformly fill said rear aperture of said condenser lens and travels through said condenser lens along a first optical path;

providing an imager lens having an aperture along a second optical path, wherein the area between said first optical path and said second optical path comprises a region of uniform illumination;

locating said area array reflective spatial light modulator in said region such that said modulator receives said uniform illumination along a first optical path and selected ones of individual elements on said modulator reflect light along said second optical path, wherein said light reflected along said second optical path completely fills said aperture of said imager lens; and tailoring illumination received by said modulator such that said modulator receives a maximum amount of said illumination.

2. The method as claimed in claim 1 wherein said imager lens accepts a maximum amount of illumination energy from said modulator.

3. The method as claimed in claim 1 wherein said tailoring step further comprises compensating for deficiencies in said optical system.

4. The method as claimed in claim 1 wherein said tailoring step further matches the path of the light rays reflected from said modulator to said aperture of said imager lens using said solid-state light-emitting elements on said substrate.

* * * * *